May 10, 1927.  1,627,698
J. R. GAMMETER
PACKING AND METHOD OF MAKING THE SAME
Filed Feb. 6, 1924   2 Sheets-Sheet 1
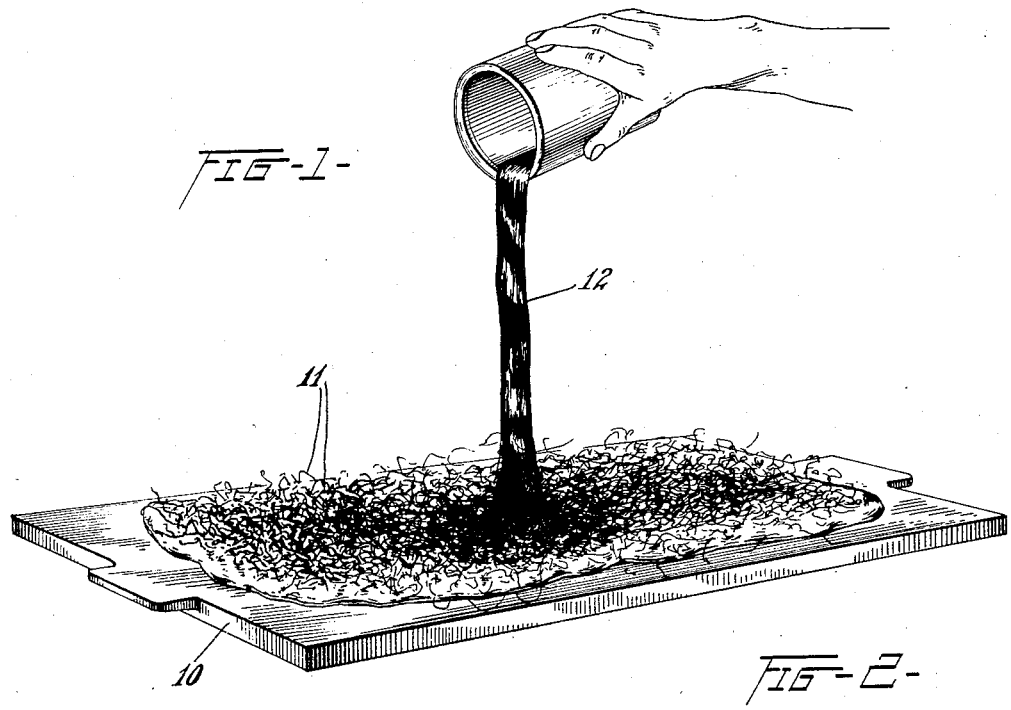
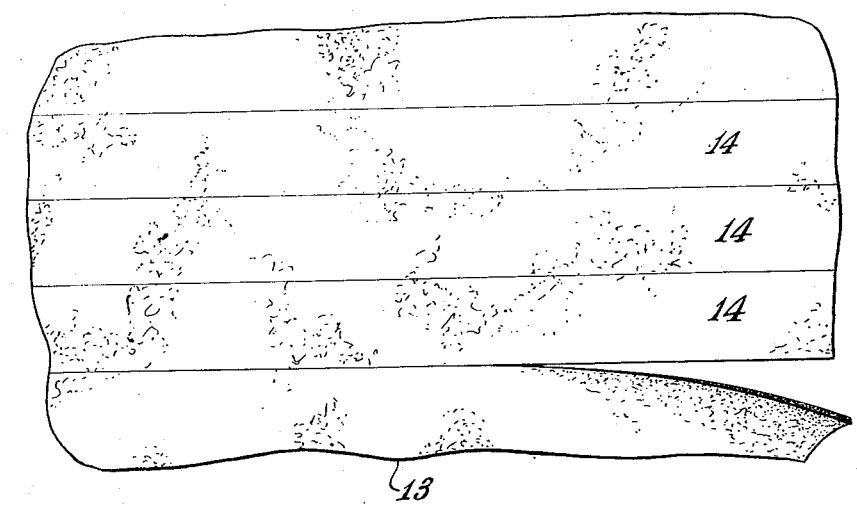
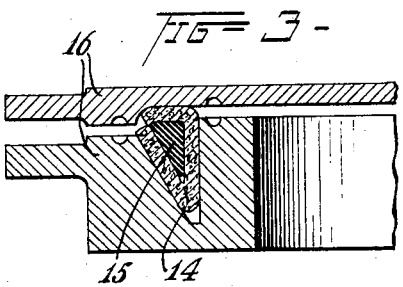
Inventor
John R. Gammeter.
By Robert M. Pierson
Atty.

May 10, 1927.
J. R. GAMMETER
1,627,698
PACKING AND METHOD OF MAKING THE SAME
Filed Feb. 6, 1924  2 Sheets-Sheet 2
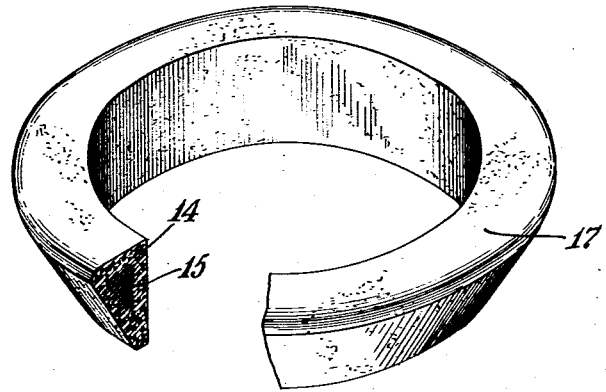
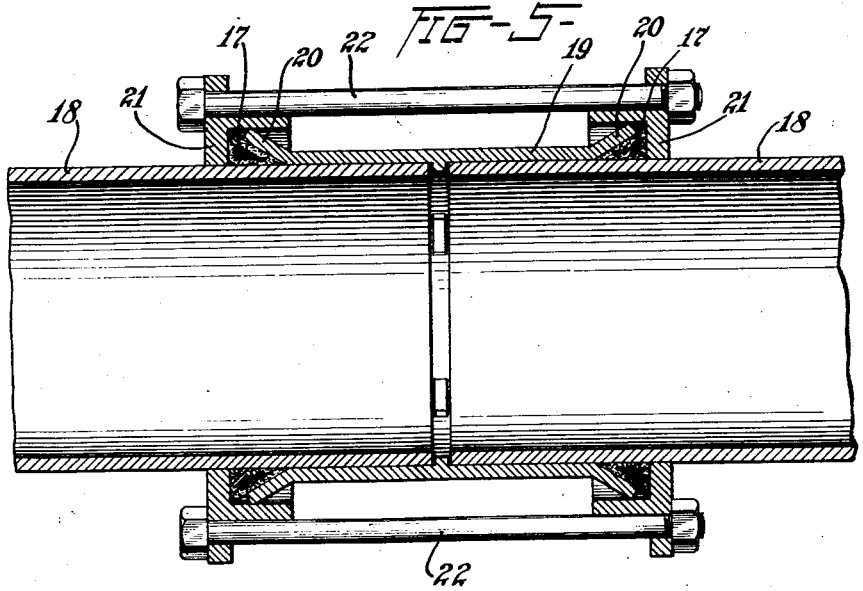
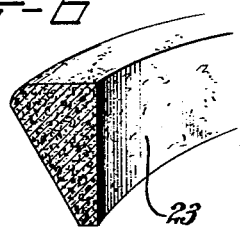
Inventor.
John R Gammeter
By Robert M Pierson
Atty Patented May 10, 1927.

1,627,698

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

PACKING AND METHOD OF MAKING THE SAME.

Application filed February 6, 1924. Serial No. 690,964.

This invention relates to packings such as washers, gaskets or packings for stuffing boxes, and to methods of making the same, and its general object is to provide an improved packing or packing material adapted to withstand the action of various fluids. More specific objects are to provide a gasket or packing which will have improved lasting and sealing qualities under the effects of heat, oils and acids, which will be durable and yet sufficiently deformable to be easily manipulated to produce an effective seal, and which may be economically and conveniently produced. A further object is to provide an improved method of making a packing having some or all of these characteristics.

Of the accompanying drawings:

Fig. 1 is a perspective view of a mold plate and my improved packing material, in a preferred form, being prepared on said plate.

Fig. 2 is a plan view of a sheet of packing produced in accordance with my invention.

Fig. 3 is a fragmentary, sectional view of a packing ring mold and a packing ring therein, in process of manufacture.

Fig. 4 is a perspective view, a part being sectioned and broken away, of a packing ring made in accordance with and embodying my invention in a preferred form.

Fig. 5 is a longitudinal section of a pipe junction including a pair of packing rings such as that shown in Fig. 4.

Fig. 6 is a sectional-perspective view of a packing ring made in accordance with and embodying my invention in a modified form.

Fig. 7 is a similar view of a ring of different cross section but otherwise corresponding to that shown in Fig. 6.

In making a packing or packing material in accordance with my invention a metal, in a finely divided condition, preferably in the attenuated form of tinsel or floss, is mixed, impregnated or similarly associated with rubber, and the mass preferably shaped and vulcanized substantially in the form which it is to assume in use. Any metal floss or tinsel, such as that of lead, copper or steel may be used, the characteristics in the finished product depending upon the particular metal employed. When a metal is used which alone would not be adapted to adhere to the rubber, as in the case of lead or steel, the tinsel or floss is preferably plated with copper, in any known or suitable manner, in order that the coating of copper may effect a good adhesion, in the vulcanized product, between the attenuated metal and the rubber with which it is associated.

Referring to the drawings, Fig. 1 shows a preferred process of producing my packing material, 10 being a mold plate upon which is first placed a layer of metal floss 11. A suitable quantity of a rubber solution or cement 12 is then poured upon said floss and allowed to permeate the layer of the latter. The solvent is then permitted to evaporate from the cement, leaving the unvulcanized rubber associated with the metal floss, after which the layer of rubber and floss is compacted, as by rolling it down or pressing it between the plate 10 and a similar plate. The mass may be partially or completely vulcanized under the pressure of such plates, if desired, to produce sheet packing or as a preliminary to producing individually molded packing members from the mass, but I do not find such preliminary vulcanization essential to the manipulation of the mass to produce individually molded members.

A sheet such as that shown at 13 in Fig. 2 being produced, either by compacting or by compacting and partially vulcanizing the mass as described, the sheet 13 is cut into strips 14, and a strip 14 is then wrapped about a core 15 of unvulcanized or partially vulcanized rubber as shown in Fig. 3, the assembly, comprising the core and the strip, approximating the form desired in the finished packing member. Said assembly is then molded and vulcanized in a mold such as that shown at 16, Fig. 3, producing a packing ring such as that shown at 17 in Fig. 4.

A form of coupling in which a ring of this type is adapted to be used is shown in Fig. 5, where 18, 18 are the adjacent end portions of metallic pipes or conduits joined by a coupling sleeve 19, the latter having flared end portions 20, 20, adapted in effect to constitute followers for respective stuffing boxes 21, 21 slidably mounted upon the pipes 18 and adapted to be drawn toward each other by bolts 22, 22, to compress the packing rings, 17, 17, within said stuffing boxes and against the pipes 18.

The packing rings 23 and 24, shown in

Figs. 6 and 7, are composed entirely of the mixture of metal floss and vulcanized rubber, the rubber core being omitted. The shape of the packing or gasket of course may be variously modified, and the rings of the types shown at 23 and 24 in Figs. 6 and 7, as well as the ring 17 of Figs. 4 and 5, may be made either by molding and vulcanizing a mixture of metallic floss and rubber produced by associating the floss with rubber cement and evaporating the solvent from the latter, as described, or by molding and vulcanizing mixtures of metallic floss and rubber produced by other procedure, as by superposing alternate layers of metal floss and unvulcanized rubber and causing the latter to become disseminated throughout the floss by heat and pressure.

In use, the metal floss resists flow of the rubber with which it is associated, in case the latter becomes softened by heat or by the action of fluids in contact therewith, so that the packing is not subject to rapid disintegration or deterioration, and the metal and the rubber protect each other against the action of such fluids, the deteriorating effect of oil upon rubber, for example, being retarded by the presence of the metal, and the disintegrating effect of acids upon the metal, for example, being retarded by the presence of the rubber. The finely divided or attenuated form of the metal is such as to permit the packing to be suitably deformed, by the members between which it is clamped, to provide an effective seal.

The packings may be readily and economically produced in a variety of shapes by simple molding operations, and the undesirable effect of separation of the rubber from the metallic element or elements of the packing is reduced to a minimum.

When the rubber core is used, the deformability or resilience of the packing member is thereby increased, while the surface layer of metal floss and rubber thereon protects the core and provides at the surface of the packing member the characteristics above described. A packing member composed in part of rubber unmixed with the metal floss also may be made more economically in some respects, since it requires a smaller quantity of the floss and less labor and less solvent for providing the mixture for a given number of packing members.

My invention is susceptible of modification within its scope and I do not wholly limit my claims to the exact procedure or to the exact embodiments herein described.

I claim:

1. The method of making a packing member which comprises mixing metal in fine, attenuated strips with a solution of curable rubber, evaporating the solvent, and molding and vulcanizing the resultant mixture in the form of a finished packing member.

2. The method of making a packing member which comprises permeating a mass of metal floss with a solution of curable rubber, evaporating the solvent, and molding and vulcanizing the resultant mixture in the form of a finished packing member.

3. The method of making a packing material which comprises forming a layer of metal floss, permeating the layer of floss with a solution of curable rubber, evaporating the solvent, and forming from the layer of floss and rubber thus produced a compacted sheet.

4. The method of making a packing member which comprises forming a sheeted mixture of curable rubber and metal floss, cutting a strip from the sheet, wrapping said strip about an annular core, and molding and vulcanizing said strip to shape about said core.

5. The method of making a packing member which comprises forming a sheeted mixture of curable rubber and metal floss, cutting a strip from the sheet, wrapping said strip about an annular core of curable rubber, and molding and vulcanizing the assembled strip and core.

In witness whereof I have hereunto set my hand this 31st day of January, 1924.

JOHN R. GAMMETER.